D. R. OLMSTED.
WAVE MOTOR.
APPLICATION FILED MAR. 21, 1921.

1,407,885.

Patented Feb. 28, 1922.
2 SHEETS—SHEET 2.

Inventor
D. R. Olmsted.

By Arthur H. Sturges.
Attorney

UNITED STATES PATENT OFFICE.

DAVID R. OLMSTED, OF COUNCIL BLUFFS, IOWA.

WAVE MOTOR.

1,407,885.

Specification of Letters Patent. Patented Feb. 28, 1922.

Application filed March 21, 1921. Serial No. 454,142.

*To all whom it may concern:*

Be it known that I, DAVID R. OLMSTED, a citizen of the United States residing at Council Bluffs, in the county of Pottawattamie and State of Iowa, have invented certain new and useful Improvements in Wave Motors, of which the following is a specification.

The present invention relates to motors, and more particularly to that type which are known as wave motors.

An object of the present invention is to provide a motor of this type wherein the impact of water in the wave is utilized for effecting the operation of the driving elements of the motor.

Another object of the invention is to provide a submersible structure adapted to receive the wave thereover, elevate the wave, and direct pressure or impact of the wave against the driving elements of the motor.

A further object of the invention is to provide a submersible structure which is given a peculiar external configuration whereby not only to elevate the wave and direct its various forces against the driving elements of the motor, but to also insure the anchorage of the structure against shifting incident to the alternating and opposed forces directed thereagainst, incident to the oncoming and receding waves.

A still further object of the invention is to provide a submersible structure which houses the operating mechanism and which supports upon its upper side operating elements to receive impact of the wave for transmitting such force to the mechanism which is housed in the submersible structure.

With the foregoing and other objects in view, the invention will be more fully described hereinafter, and will be more particularly pointed out in the claims appended hereto.

Figure 1:
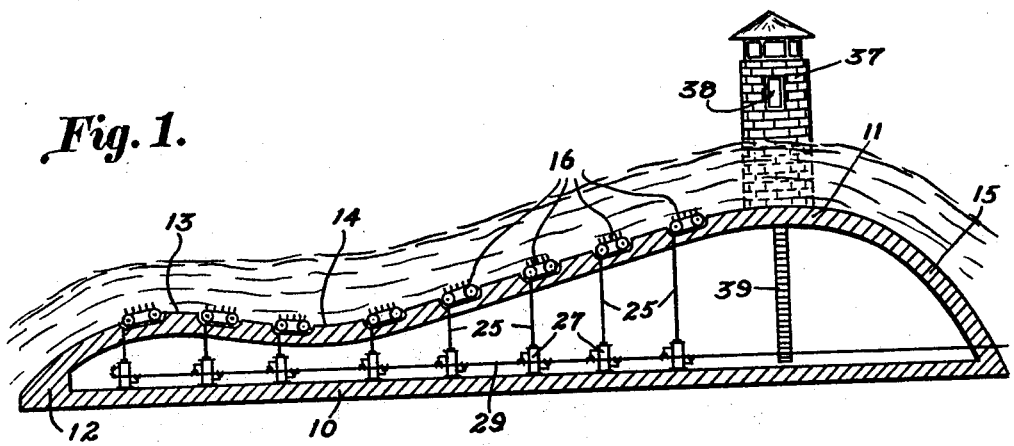
Figure 2:
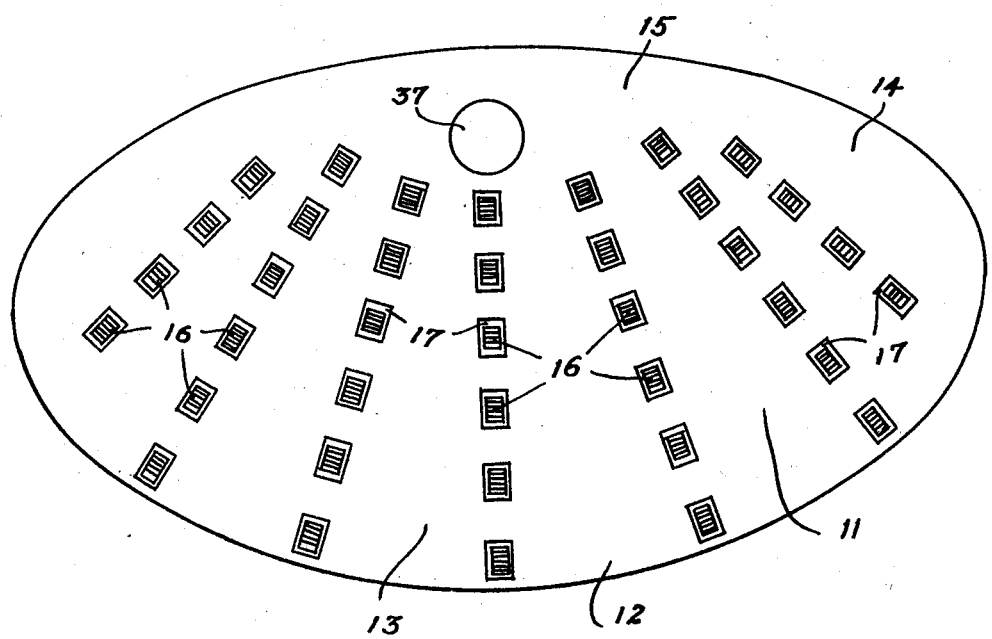
Figure 3:
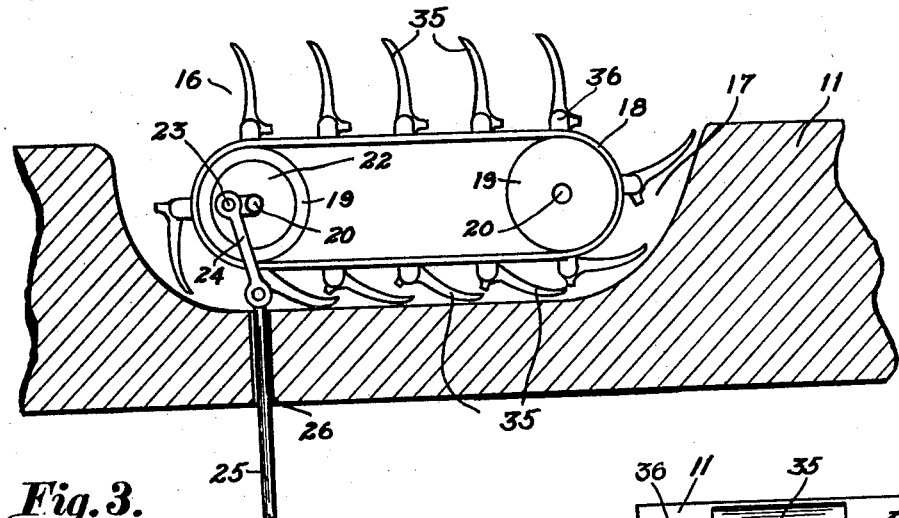
Figure 3:
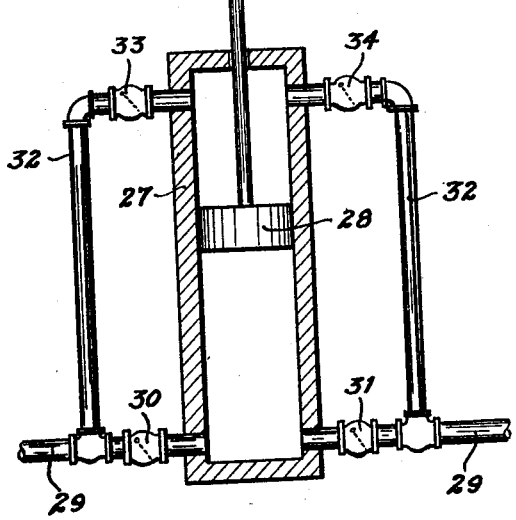
Figure 4:
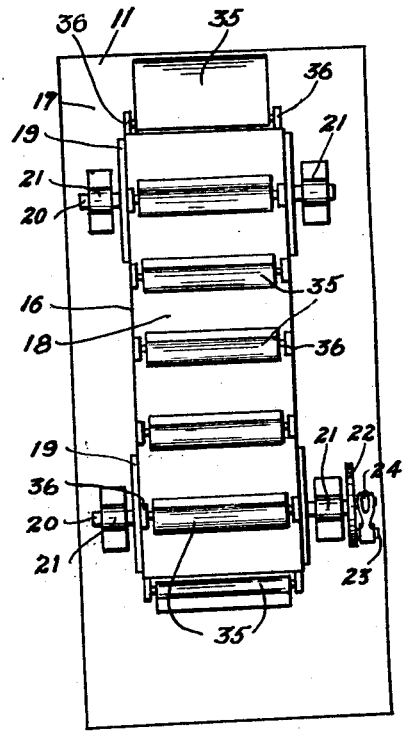

In the drawings, wherein like symbols refer to like or corresponding parts throughout the several views, Fig. 1 is a vertical section taken substantially centrally through the wave motor constructed according to the present invention.
Fig. 2 is a top plan view of the same;

Fig. 3 is a fragmentary enlarged sectional view taken through a portion of the submersible structure, showing the impact receiving devices and a pump connected thereto for operation thereby; and Fig. 4 is a top plan view of the same.

Referring to the drawings, 10 designates the base or bottom of a submersible structure adapted to be submerged in the water at or near the shore and in such position that waves may pass over the submersible structure as will hereinafter be described. This submersible structure or body portion is provided with a top wall 11 which is curved to present in horizontal section the crest and trough of a wave and at the same time the top wall 11 is inclined downwardly at the desired slope from the inner to the outer end of the structure or body portion to form an incline adapted to elevate the wave during the incoming of the same toward the shore.

This top wall 11 at its forward end merges in a gradual curve into the base 10 and provides a forward abutting edge 12 which in horizontal section, is arranged for deflecting the oncoming waves upwardly onto the wall 11. The wall 11 at its forward end rises gradually from the edge 12 to the forward crest 13 and thence is arched downwardly and gradually to form a trough 14 and from the trough merges gradually and upwardly into the rear elevated crest of the top wall 11.

From the rear crest the top wall drops somewhat abruptly to the rear edge of the base 10 for forming a rearwardly facing abutment 15 against which the receding waves or water is adapted to impact for steadying the submersible structure against shifting incident to impact of the oncoming waves against the forward edge 12.

This submersible structure therefore has a base 10 adapted to rest flat upon the bottom of the sea or other body of water, and has an upper face or surface which simulates the formation of a wave, and which is inclined in a general upward and rearward direction for elevating the wave to utilize the impact of the wave incident to this volume and velocity.

As shown particularly in Fig. 2, the submersible body in plan is substantially oval in shape with a curved major axis, and presenting a relatively long curved forward edge 12, and a relatively short curved edge at its rear side. Such structure is adapted with but slight resistance to receive thereover and elevate the oncoming waves and to permit of the quick and easy fall of the expended waves from the rear side of the device, in a manner to offer only the desired resistance or impact against the submersible structure.

For the purpose of utilizing the force of impact of the waves passing over the top 11 of the submersible structure, the latter is provided upon its top wall with preferably a plurality of impact devices 16 arranged in rows radiating from an axial center, upon which the outer curved edge 12 of the body is struck.

These impact receiving members 16 are each preferably of the construction shown in detail in Figs. 3 and 4. Each device is seated in a pocket or depression 17 formed in the upper surface of the top wall 11, and each device comprises an endless belt 18 mounted upon rollers 19, supported on shafts 20. The shafts 20 have bearing at opposite ends in brackets or bearings 21, which are mounted on the wall 11.

These bearings 21 are preferably arranged within the recess 17 and the cylinders or rollers 19 are suitably spaced apart to sustain the endless belt 18 in the general longitudinal direction of the row of the devices 16. One of the cylinders has its shaft 20 extending beyond an adjacent bearing 21, and a disc 22 is mounted on the extension of the shaft 20, and has a wrist pin 23 to which is connected a link 24 extending from a piston rod 25. The piston rod 25 passes down through a suitable opening 26 formed in the wall 11, and projects into a cylinder 27, and has connection with a piston 28 adapted to reciprocate in the cylinder 27 for pumping water or the like.

The cylinder 27 is connected at its lower end in a pipe line 29 comprising a suction and a discharge pipe, and in which are disposed check valves 30 and 31 controlling the passage of fluid in one direction through the pipe line 29, so that upon lifting of the piston 28 fluid is drawn in through valve 30 and upon lowering of the piston 28, the fluid is ejected through valve 31.

The upper end of the cylinder 27 is connected in a by-pass pipe 32 extending from the main pipe 29, and provided with check valves 33 and 34, controlling the passage of fluid in one direction through the by-pass pipe 32. Downward movement of the piston 28 draws fluid through the check valve 33 into the top of the cylinder 27, and raising of the piston 28 causes the ejecting of the fluid from the top of the cylinder 27 through the check valve 34.

In this manner there is substantially a continuous flow of fluid through the main pipe 29, as the main pipe is connected to one end of the cylinder 27, and the by-pass pipe 32 is connected to the other end thereof for effecting the forcing of the fluid in the same direction through both the main pipe and the by-pass. Each pump cylinder employed is provided with a main pipe 29, the discharge pipe of each pump cylinder being connected to the suction pipe of the adjacent pump cylinder, so that a constant and steady flow of the fluid is effected throughout the entire length of the pipe line, and consequently considerable pressure is had in the discharge end of the pipe line. The pipe 29 may be used for lifting water to a desired height on the shore, for driving turbines or for use in any suitable manner in which it may be desired to convert the energy and weight of the waves.

From Figs. 1 and 2 it will be noted that the submersible body is hollow, that the pumps 27 are arranged within the hollow body, and the rods 25 extend downwardly into the body from the upper surface thereof to connect the impact receiving devices to the pumps or means of transmission of the power.

The endless belts 18 are each provided with a plurality of blades or flights 35 of suitable configuration for receiving impact of the water thereagainst, as the water in wave form traverses the upper surface of the body 10, the flights being foldable on bracket lugs 36 to lie closely against the lower run of the endless belt 18. The bottom of the recess or pocket 17 in the top wall 11 constitutes a guide adapted to engage and turn over the flights 35.

Furthermore, in undertow the outward flowing of water over the top wall 11 passes through the pockets 17 beneath the belt 18 and engages the flights 35 for further assisting the turning of the belt.

As shown in Fig. 1, the top or rear crest of the submersible body 10 may be provided with a lighthouse or tower 37 to the interior of which access may be gained through a door 38, and a ladder or stairway 39 may extend upwardly through the hollow body into the tower 37 to permit easy access to the interior of the body, for adjusting, repairing and regulating the operation of the pumps 27, and other apparatus employed.

This tower 37, as shown in Fig. 2, is located at substantially the apex of the structure and the waves are adapted to approach the tower and fall down over the abrupt rear wall 15 immediately beyond the tower.

The wave motor may be installed by first erecting a coffer dam, then building the hollow body therein and after the same is properly set and the parts are in position the coffer dam may be torn out. The oncoming wave is elevated as it flows over the upwardly inclined wall 11 and consequently the impact receiving devices are actuated by impact of the wave, incident to its rate of flow.

The peculiar shape of the hollow body 10 not only permits of the relatively easy flow and rise of the waves over the wall 11, but also provides a steadying wall 15 at the rear of the structure, which is adapted to receive impact of the receding water for counteracting the impact of the oncoming waves and to thus offset to an appreciable extent, any tendency for the hollow body to shift under the action of the waves.

I do not wish to be restricted to the size, form, and proportions of the various parts, and obviously changes could be made in the construction herein described without departing from the spirit of the invention, it being only necessary that such changes fall within the scope of the appended claims.

What is claimed is:

1. In a wave motor, a submersible structure conforming in plan substantially to an oval with a relatively long outer curved edge and a relatively short inner curved edge, and having an upper surface of trough and crest shape, and impact receiving devices mounted on the top of said structure for transmitting power from waves passing over the structure when submerged.

2. In a wave motor, a submersible structure having an upper surface of substantially crest and trough shape for receiving waves thereover, and impact receiving devices mounted on the submersible structure adapted to be operated by said waves.

3. In a wave motor, a hollow body adapted to be submerged beneath the water, the top wall thereof being adapted to receive waves upon its upper surface, means upon the top wall for receiving and transmitting the impact of the waves, pumping means connected to and actuated by said means, a pipe line connected to the pumping means through which liquid may be steadily circulated by the pumping means and means for bracing the wave motor against the force of the waves whereby the same is maintained stationary.

4. In a wave motor, a hollow body adapted to be submerged beneath the waves and having an upper undulating surface simulating the cross sectional shape of a wave and having said upper surface inclined, upwardly toward the shore for elevating the waves, and impact receiving devices on said upper surface adapted to be operated by the impact of the oncoming waves.

5. In a wave motor, a submersible body having a gradually inclined and undulating upper wall over which waves are adapted to pass and provided with an abruptly and downwardly curved rear wall leading from the said upper wall to the base of the body whereby the water of the oncoming waves may fall to the rear of the hollow body and impact against said abrupt wall for offering a counter-resistance to the impact of the oncoming waves.

6. In a wave motor, a hollow body, a plurality of pumps mounted in the body, a pipe line connected to all of the pumps adapted to receive fluid under pressure therefrom, impact receiving device arranged upon the upper surface of the body and adapted to receive impact of waves passing over the body, and connections between said impact receiving devices and said pumps for transmitting energy of the waves to the pumps.

7. In a wave motor, a substantially oval hollow body, a plurality of impact receiving devices arranged upon the upper face of the body, a plurality of pumps mounted in the body, a pipe line connecting said pumps and leading to a suitable point of discharge, and connections between the impact receiving devices and the pumps for actuating the latter.

In testimony whereof, I have affixed my signature in presence of two witnesses.

DAVID R. OLMSTED.

Witnesses:
ARTHUR H. STURGES,
HIRAM A. STURGES.